US009104327B2

(12) United States Patent
Gorobets et al.

(10) Patent No.: US 9,104,327 B2
(45) Date of Patent: Aug. 11, 2015

(54) FAST TRANSLATION INDICATOR TO REDUCE SECONDARY ADDRESS TABLE CHECKS IN A MEMORY DEVICE

(75) Inventors: Sergey Anatolievich Gorobets, Edinburgh (GB); William Wu, Cupertino, CA (US); Steven T. Sprouse, San Jose, CA (US)

(73) Assignee: SanDisk Technologies Inc., Plano, TX (US)

( * ) Notice: Subject to any disclaimer, the term of this patent is extended or adjusted under 35 U.S.C. 154(b) by 303 days.

(21) Appl. No.: 13/464,426

(22) Filed: May 4, 2012

(65) Prior Publication Data

US 2012/0297118 A1    Nov. 22, 2012

Related U.S. Application Data

(60) Provisional application No. 61/487,215, filed on May 17, 2011.

(51) Int. Cl.
*G06F 12/00*    (2006.01)
*G06F 3/06*    (2006.01)
(Continued)

(52) U.S. Cl.
CPC .............. *G06F 3/064* (2013.01); *G06F 3/0611* (2013.01); *G06F 3/0679* (2013.01); *G06F 12/0223* (2013.01); *G06F 12/10* (2013.01); *G06F 12/1009* (2013.01)

(58) Field of Classification Search
CPC ..... G06F 3/0638; G06F 3/064; G06F 3/0641; G06F 12/02; G06F 12/0223; G06F 12/0292; G06F 12/10; G06F 12/1009
USPC ........................................................ 711/103
See application file for complete search history.

(56) References Cited

U.S. PATENT DOCUMENTS 5,946,714 A    8/1999    Miyauchi
6,000,006 A    12/1999    Bruce et al.
(Continued)

FOREIGN PATENT DOCUMENTS

EP    1 927 920 A2    6/2008
WO    2010/078545 A1    7/2010

OTHER PUBLICATIONS

International Search Report and Written Opinion issued in international application No. PCT/US2012/037287, mailed Aug. 14, 2012 (11 pages).

(Continued)

*Primary Examiner* — Aimee Li
*Assistant Examiner* — Prasith Thammavong
(74) *Attorney, Agent, or Firm* — Brinks Gilson & Lione (57) ABSTRACT

A system and method for reducing the need to check both a secondary address table and a primary address table for logical to physical translation tasks is disclosed. The method may include generating a fast translation indicator, such as a logical group bitmap, indicating whether there is an entry in the secondary address table that contains desired information pertaining to a particular logical address. Upon a host request relating to the particular logical address, the storage device may check the bitmap to determine if retrieval and parsing of the secondary table is necessary. The system may include a storage device having RAM cache storage, flash storage and a controller configured to generate and maintain at least one fast translation indicator to reduce the need to check both secondary and primary address tables during logical to physical address translation operations of the storage device.

20 Claims, 9 Drawing Sheets (51) Int. Cl.
*G06F 12/10* (2006.01)
*G06F 12/02* (2006.01)

(56) References Cited

U.S. PATENT DOCUMENTS

| | | | |
|---|---|---|---|
| 6,834,325 | B1 | 12/2004 | Milillo et al. |
| 7,529,880 | B2 | 5/2009 | Chung et al. |
| 8,296,538 | B2 * | 10/2012 | Grisenthwaite ............... 711/163 |
| 8,429,378 | B2 * | 4/2013 | Ingle et al. ................... 711/208 |
| 8,700,883 | B1 * | 4/2014 | Glasco et al. ................. 711/220 |
| 2004/0221192 | A1 * | 11/2004 | Motta et al. ....................... 714/8 |
| 2009/0043985 | A1 * | 2/2009 | Tuuk et al. ..................... 711/205 |
| 2009/0187731 | A1 * | 7/2009 | Deutschle et al. ............ 711/207 |
| 2011/0055458 | A1 | 3/2011 | Kuehne |
| 2011/0320758 | A1 * | 12/2011 | Craddock et al. ............. 711/206 |

OTHER PUBLICATIONS

Wu, Fei, et al., Cache Blocks: An Efficient Scheme for Solid State Drives without DRAM Cache, 2010 Fifth IEEE International Conference on Networking, Architecture, and Storage, dated Jul. 15, 2010 (8 pages).

* cited by examiner

FAST TRANSLATION INDICATOR TO REDUCE SECONDARY ADDRESS TABLE CHECKS IN A MEMORY DEVICE

CROSS-REFERENCE TO RELATED APPLICATIONS

This application claims the benefit of U.S. Provisional Application No. 61/487,215, filed May 17, 2011, the entirety of which is hereby incorporated herein by reference.

BACKGROUND

Non-volatile memory systems, such as flash memory, have been widely adopted for use in consumer products. Flash memory may be found in different forms, for example in the form of a portable memory card that can be carried between host devices or as a solid state disk (SSD) embedded in a host device.

Some flash memory management systems employ self-caching architectures for data buffering and data caching. For example, caching may be used for data buffering where data received from the host device is first stored in a portion of the memory designated as the cache and is later copied to a portion of the flash memory designated as a main storage area (such as a multi-level cell (MLC) type flash memory). As another example, caching may be used for control data storage to improve operation time. Control data may include mapping tables and other memory management data used by in the flash memory.

When a host device requests data from, or writes data to, a flash memory, the host read request includes logical address information that the flash memory must then map to physical flash memory addresses. As part of this mapping process, multiple mapping table (also referred to as control data) lookups are typically necessary. For example, the flash memory system may have data organized such that fragments of logical groups are stored in a cache area of flash memory and the remainder of the logical group associated with the data request is in main storage in the flash memory.

A typical way in which the flash memory will search for data associated with a host request is to always first check for possible logical group fragments in a secondary table that tracks logical group fragments in the cache and then search for the logical group information in a primary table in main storage. However, there may be many instances where there are no logical group fragments in the cache associated with the requested data. In these instances, checking the secondary index for entries on relevant logical group fragments will result in a "miss" where no result will be returned because no logical group fragments relating to the logical group are present. When the number of logical fragments are few, the process of always retrieving and parsing the secondary table that tracks logical group fragments in the cache, prior to then retrieving and parsing a primary table, can lead to many misses in the secondary table. The time necessary to retrieve and parse the secondary table is then wasted and may slow down overall flash performance.

SUMMARY

In order to address the problems noted above, a method and system for reducing binary cache checking is disclosed. According to a first aspect of the invention, a storage device is disclosed that includes a non-volatile memory and a controller having a volatile memory, where at least two levels of address tables containing logical to physical address mapping information for the storage device are stored. The controller is configured to establish and maintain a fast translation indicator, such as a logical group bitmap, to indicate whether data associated with a logical group number is present in a particular address table such that, upon receiving a host query regarding a particular logical group number the controller may determine whether it is necessary to retrieve and parse all of the address tables.

BRIEF DESCRIPTION OF THE PRESENTLY PREFERRED EMBODIMENTS

Figure 1:
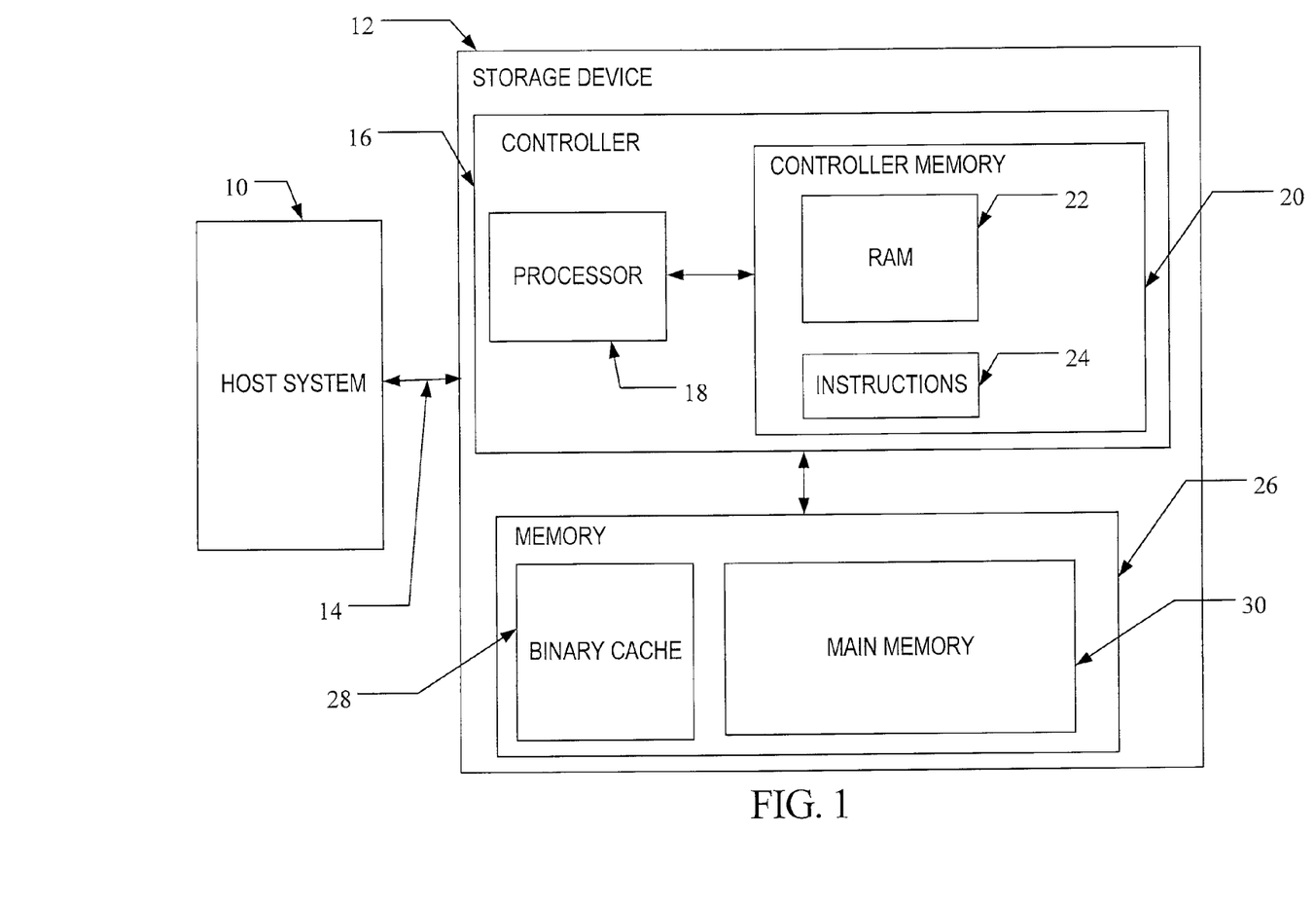
FIG. 1 is a block diagram of a self-caching memory system.

A flash memory system suitable for use in implementing aspects of the invention is shown in FIG. 1. A host system 10 stores data into, and retrieves data from, a self-caching storage device 12. The storage device 12 may be embedded in the host system 10 or may exist in the form of a card or other removable drive, such as a solid state disk (SSD) that is removably connected to the host system 10 through a mechanical and electrical connector. The host system 10 may be any of a number of fixed or portable data generating devices, such as a personal computer, a mobile telephone, a personal digital assistant (PDA), or the like. The host system 10 communicates with the storage device over a communication channel 14.

The storage device 12 contains a controller 16 and a memory 26. As shown in FIG. 1, the controller 16 includes a processor 18 and a controller memory 20. The processor 18 may comprise a microprocessor, a microcontroller, an application specific integrated circuit (ASIC), a field programmable gate array, a logical digital circuit, or other now known or later developed logical processing capability. The controller memory 20 may include volatile memory such as random access memory (RAM) 22 and/or non-volatile memory, and processor executable instructions 24 for handling memory management.

As discussed in more detail below, the storage device 12 may include functions for memory management. In operation, the processor 18 may execute memory management instructions (which may be resident in instructions 24) for operation of the memory management functions, such as detailed in FIG. 3. The memory management functions may control the assignment of the one or more portions of the memory within storage device 12, such as controller memory 20. For example, memory management functions may allocate a portion of controller memory 20 for permanent cache, may allocate a portion of controller memory 20 for temporary data cache, or may reclaim the portion allocated to temporary data cache for another purpose. One, some, or all of the memory management functions may be performed by one or separate elements within the storage device 12. For example, allocating memory regions for temporary data cache may be performed by Media Management Layer (MML) firmware, and reclaiming a temporary data cache may be performed by Data Path Layer (DPL) firmware.

One or more types of data may be cached in RAM 22 in storage device 12. One type of data that may be cached in storage device 12 is host data, which is data sent to or received from the host device 10. Another type of data that may be cached in storage device 12 is control data. Other types of data for caching are contemplated.

The memory 26 may include non-volatile memory (such as flash memory). One or more memory types may compose memory 26, including without limitation single level cell (SLC) type of flash configuration and multi-level cell (MLC) type flash memory configuration. The SLC flash may be configured as a binary cache 28 and SLC or MLC may be used as main storage 30.

Figure 2:
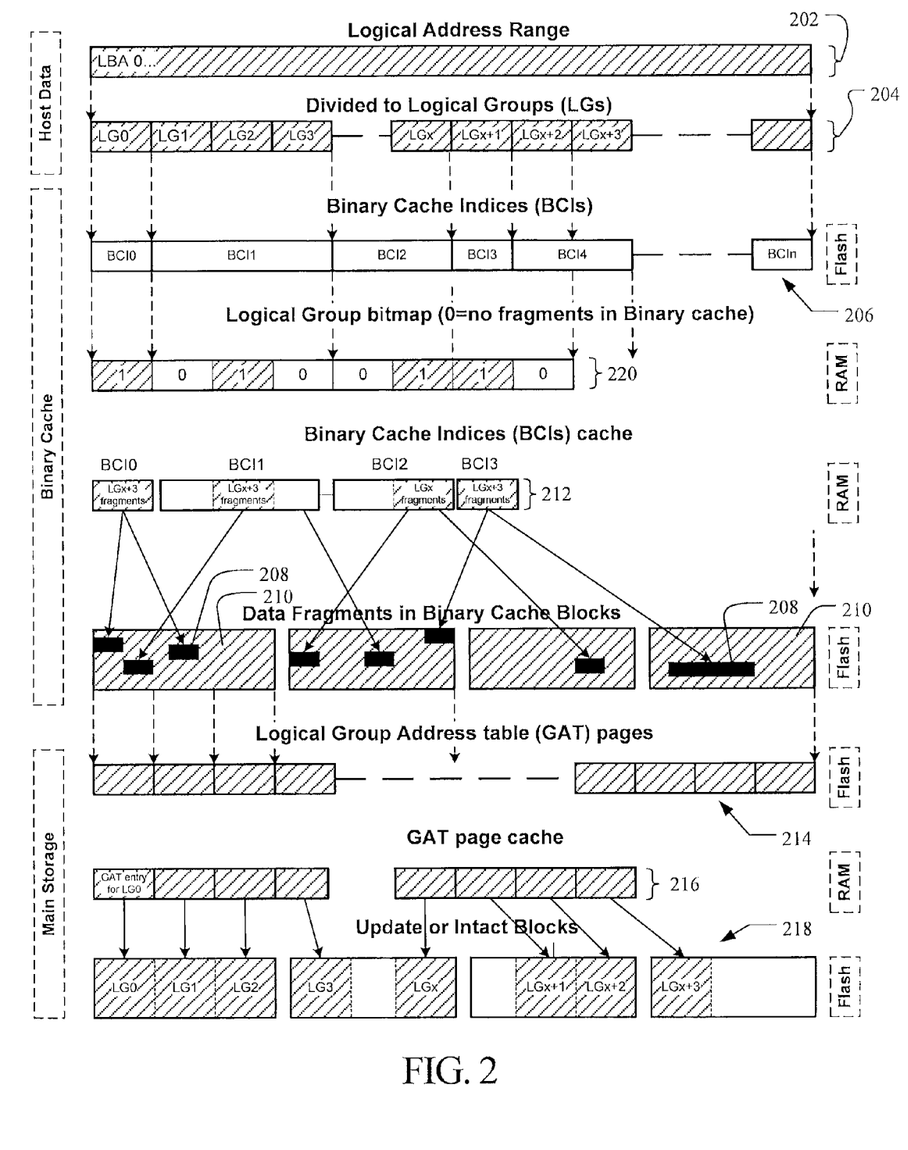
FIG. 2 illustrates a primary and secondary address table arrangement used with a logical group binary cache bitmap.

Referring now to FIG. 2, an improved address translation scheme for reducing the number of binary cache checks performed in response to a host data request is illustrated. As is typical for a host, the host system 10 utilizes a host file system that maintains a logical address range 202 for all logical block addresses (LBAs) that have been assigned by the host system 10 to data. These LBAs are grouped into logical groups (LGs) 204. As part of the process of writing and erasing data having LBAs that fall within specific LGs, certain fragments of LGs may be written into the binary cache 28 portion of the flash memory 26 rather than to the main storage 30 portion of the flash memory 26. Fragments of LGs that are written into the binary cache 28 are mapped in a table referred to as a binary cache index 206 to track the logical to physical address relationship for a data fragment 208 associated with a LG currently written into a binary cache block 210. Although the binary cache indices 206 are one type of control data that is typically stored in the binary cache portion of flash memory 26, a copy of all or a portion of the binary cache indices 212 may also be maintained (cached) in RAM 22 due to frequent use or recent use. Logical group address tables (GAT) 214 are kept in main storage flash memory. The GAT pages 214 provide the logical to physical mapping for logical groups of data and, as with the binary cache indices 206, a copy of some or all of the GAT pages may also be cached in RAM in the storage device 12. The cached GAT pages 216 point to the physical locations for the update or intact blocks in main storage flash memory 218 for each of the respective logical groups.

As discussed above, a storage device would previously respond to a host query regarding data associated with logical addresses by methodically first retrieving and parsing the binary cache indices 206, 212 to look for any logical group fragments possibly present in the binary cache portion of flash memory, and by then retrieving and parsing GAT table pages 214, 216 from main storage and/or RAM, respectively. In one embodiment, a fast translation indicator, such as a logical group bitmap 220, is generated and maintained by the controller of the storage device 12 to assist in reducing the number of times that the binary cache index is accessed. The logical group binary cache bitmap 220 provides an indication of whether a data fragment associated with a particular logical group is to be found in the binary cache 28. The bitmap 220 is quickly readable in comparison to a secondary address table like a BCI 212. In this manner, the logical group binary cache bitmap 220 of FIG. 2 provides a way of accelerating address translation from logical to physical addresses by allowing the controller to bypass unnecessary retrieval and parsing of the binary cache indices 206, 212 when no relevant data fragments are in the binary cache 28.

In one embodiment, the controller maintains a logical group bitmap 220 that contains a single bit (one or a zero), for example, indicating whether or not data corresponding to a logical group exists in the binary cache. In the embodiment illustrated in FIG. 2, the GAT 214, 216 is considered the primary address table for logical group addresses and is shown with a granularity of one GAT page for each logical group. The binary cache index 206, 212, is also referred to herein as the secondary address table. In FIG. 2 the granularity of the BCI is sector level rather than page level. For ease of reference in this example, the logical group bitmap 220 has a granularity equal to logical group size which, in this case, equals the granularity of the GAT page size. In different embodiments, the logical group size can equal a block, a sub-block (an amount of data less than a block) or a unit not related to block size. Also, in other implementations, the bitmap 220 need not have entries that correspond to a logical group. For example, the unit of logical space associated with each entry of the bitmap 220 may be a multiple or a fraction of a logical group. In yet other embodiments, an entry in the bitmap may correspond to multiple discontiguous logical areas or ranges.

Although a bitmap 220 is illustrated, the fast translation indicator may alternatively be any of a number of types of data structures that provide a fast searchable shortcut for the controller of the storage device 12 to indicate whether the controller needs to look at a secondary address table (such as a BCI 212) before searching a primary address table (such as the GAT 214). An example of another fast translation indicator may be a list, where a list of ranges of logical groups in the secondary address table that have data fragments associated with them (or that don't have data fragments associated with them) is available as alternative to the slower retrieval and parsing of the secondary address table (e.g. BCI) itself during an address translation operation.

Figure 3:
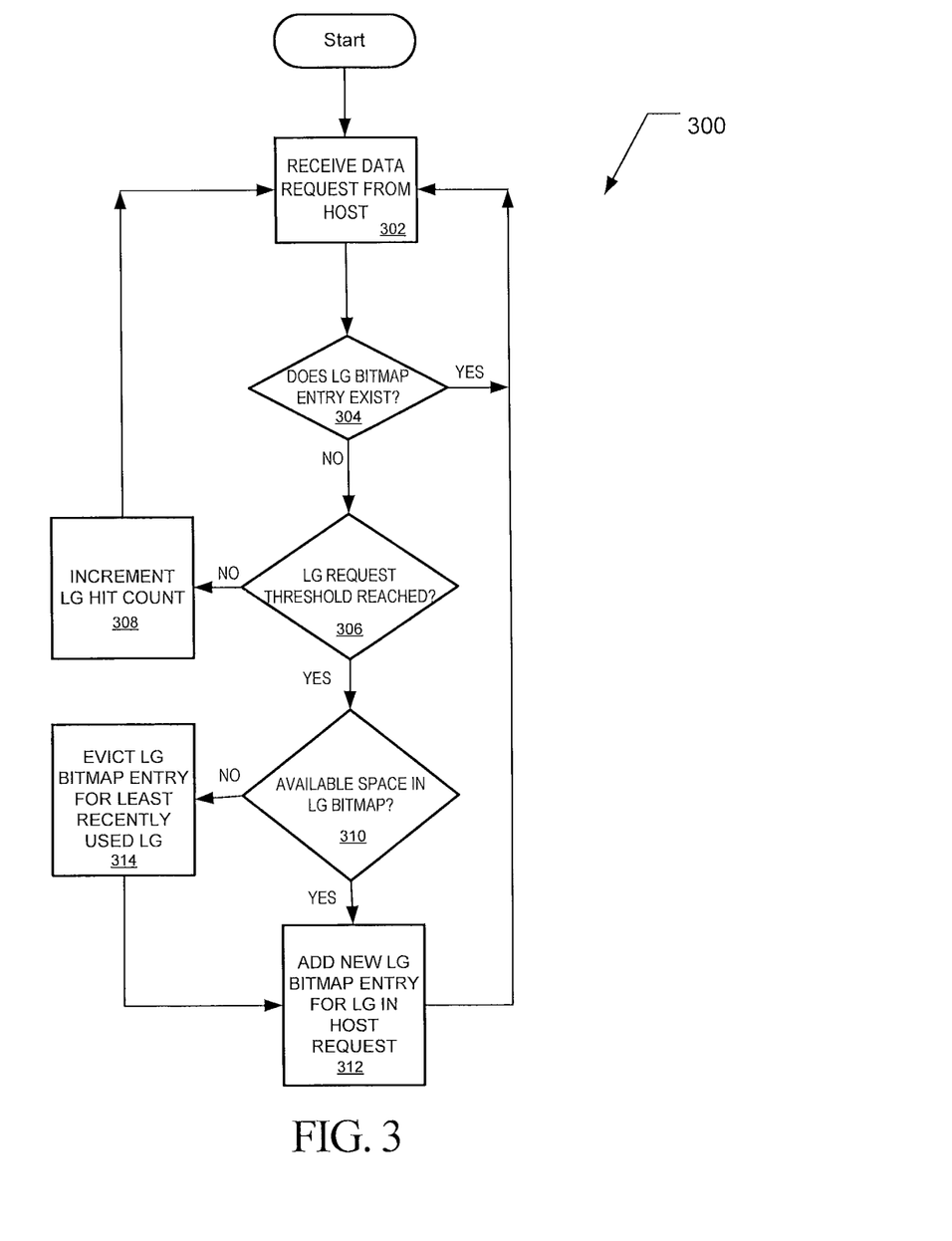
FIG. 3 is a flow diagram illustrating one method of generating a logical group binary cache bitmap.

FIG. 3 illustrates one method 300 for initially populating and updating the logical group binary cache bitmap 220. Assuming that the amount of RAM available in the controller of the storage device 12 is less than that necessary to store a bitmap that covers all of the logical groups, a logical group binary cache bitmap may be created by the controller allocating a certain amount of RAM 22 for the bitmap and then only populating the bitmap 220 with a new entry on demand. In other words, in one implementation a bitmap entry for a particular logical group may be added after a host request associated with that particular logical group is received (at 302). The controller will check to see if an entry in the logical group bitmap already exists (at 304). While a bit map entry may be generated for each LG a host requests, in one implementation an entry in the bitmap for a logical group may only be generated if the particular logical group has been identified in at least a threshold number of host requests (hit count), where the threshold is greater than 1 (at 306). If the number of host requests for the particular LG has not reached the desired threshold, the controller may increment a hit counter for the logical group and await a next host query to see if the threshold has been reached (at 308).

Assuming that the threshold has been reached, the controller 16 checks to see if there is enough space in the RAM 22 allocated for the bitmap 220 for the new entry (at 310). A new LG bitmap entry is added if space exists (at 312). Once the space available for the logical group binary cache bitmap 220 has been filled up, the next time a new logical group qualifies for an entry in the bitmap, the controller may evict a lower priority bitmap entry, for example by utilizing an entry selection algorithm based on the least recently used (LRU) logical group (the logical group that has been least recently requested by the host) (at 314) and then add the new LG entry to the bitmap (at 312). In this embodiment, the logical group bitmap in RAM identifies the most recently used logical groups (for logical groups meeting the minimum threshold number of host queries) at any given time. The initial entry for each LG in the bitmap 220 will be initialized as a "1" indicating that a fragment for the logical group is expected to be found in the binary cache. As described in greater detail below, this entry may be later changed to a "0" by the controller if no fragment is found after parsing the BCI so that subsequent host requests for the logical group can skip the process of retrieving and parsing the BCI. In one embodiment, all or a portion of the logical group bitmap 220 may be stored non-volatile memory on the storage device when the logical bitmap, or portion thereof, is evicted from RAM. In this embodiment, the logical bitmap information would then be retained for later reload into RAM without losing the bitmap information (i.e. without needing to initialize all entries of the logical bitmap to "1" when the logical bitmap is reloaded into RAM).

Figure 4:
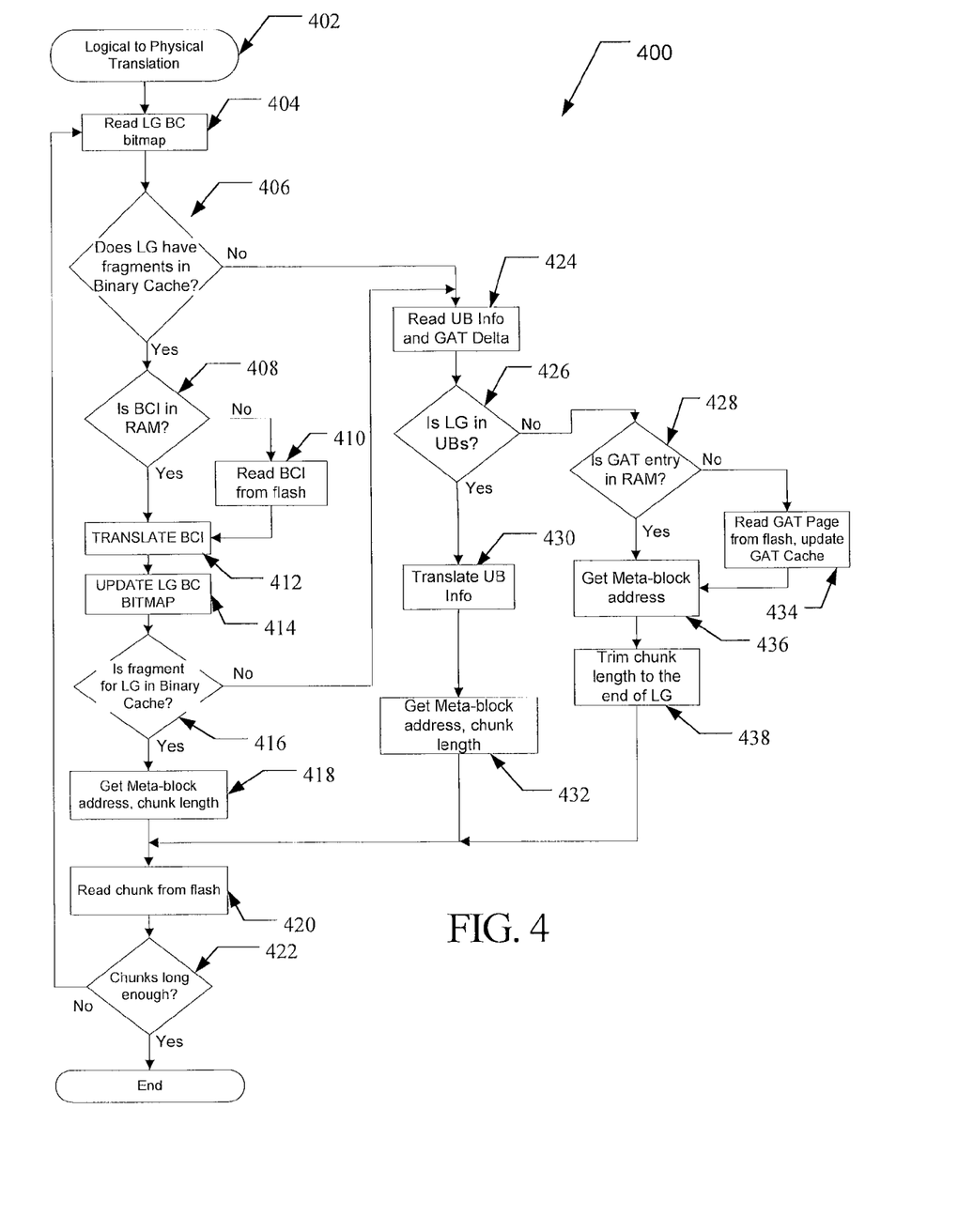
FIG. 4 is an exemplary flow diagram illustrating operation of a memory management controller.

By populating a logical group bitmap 220 as illustrated in FIGS. 2-3, the controller can check whether a fragment of data associated with a logical group is expected to be in the binary cache, by indication of a "1" in the logical group bitmap entry, or is not expected to be in the binary cache, by indication of a "0", to avoid having to retrieve the binary cache index and parse the index each time. Referring to FIG. 4, a method 400 of utilizing a storage device 12 having a logical group bitmap 220 is illustrated. Upon receipt of a host query for certain logical groups, the storage device 12, engages in a logical to physical translation process (at 402). The input parameters for this process, received from the host, may include the logical group number, the logical group offset, and the length of the address run for the logical group. The controller accesses the bitmap, which may be maintained in controller RAM (at 404). If an entry for the logical group does not exist in the bitmap, an entry may be created using a process such as discussed in FIG. 3, followed by a review of both the BCI 206, 212 and the GAT 214, 216 for relevant data associated with the LG. Where no entry exists, the controller may not be able to bypass the BCI retrieval and review.

The controller 16 of the storage device 12 reads the logical group bitmap to determine whether the logical group identified in the host query has fragments of data maintained in the binary cache of the flash memory 304 (at 406). As noted above, the determination of whether logical group fragments are in the binary cache is made by looking at the value in the logical group binary cache bitmap 220 to see whether a "1" is present, indicative of the possibility of information being in the binary cache, or a "0" indicative of the fact that no data for that logical group is currently in the binary cache. Assuming that the logical group binary cache bitmap 220 indicates a fragment is in binary cache for the logical group, the controller then looks for the binary cache index.

A copy of the binary cache index is first looked for in RAM 22 (at 408) and, if not found in RAM, the binary cache index is retrieved from flash memory 26 (at 410). Once the binary cache index is found, the binary cache index is translated by the controller and a physical address of the fragment associated with the logical group fragment is retrieved (at 412), if there is a fragment associated with the LG in the binary cache. Although retrieval of the address for the logical group fragment is generally expected if there is a bitmap entry set to "1", there may be a "miss", where no fragment is found in certain circumstances. For example, a miss may occur when the logical group binary cache bitmap is being accessed with respect to a logical group number for the first time. The default setting of the logical group binary cache bitmap is set to "1" for that logical group number entry by default until a first retrieval attempt is made for that logical group number and that entry in the binary cache logical group bitmap is updated. Also, a miss may occur because the logical group binary cache bitmap 220 may not have been fully updated due to a recent power cycle, or if a segment of the bitmap had been evicted from RAM due to space restriction, which resets the reloaded bitmap to all "1's." Regardless of whether a fragment is found in the BCI for the logical group number, the controller updates the logical group binary cache bitmap entry at this point (at 414). If a fragment was found, the entry is left at a "1" setting and if no fragment is found the entry is updated to a "0" so that the controller can know to skip over the steps of retrieving and parsing the BCI next time a host request is received for that logical group number and the process 400 is repeated. The method illustrated in FIG. 4 is for a read process. An entry in the fast translation indicator, in this example the bitmap 220, may be updated from a "0" to a "1" by the controller 16 during a write process when a data fragment is written to memory to reflect that a secondary address table such as the BCI now contains the logical to physical mapping for that data fragment.

Assuming that a fragment did exist for the logical group number, the metablock address and chunk length information of the fragment are retrieved (at 416, 418) and that chunk of data may be read from that physical metablock address in binary flash memory (at 420). Assuming that the chunks retrieved are long enough to cover all of the sectors included in the logical group identified in the host query (or in multiple logical groups if they are implicated by the same host query) (at 422), then the retrieval has ended and the process stops. If the retrieved chunks are not long enough to cover the logical group, then the bitmap is checked again to retrieve any other fragments for the logical group number or range initially requested by the host (at 422). As used herein, a "chunk" is an amount of data that can be read contiguously, logically and physically. The maximum chunk size may be a block.

In the case where a review of the secondary address table (here the BCI) indicates a logical group number does not have any fragments in the binary cache (at 406) or the controller experiences a "miss" by retrieving and checking the BCI only to find there is no logical fragment (at 316), the controller may look at the primary address table (the GAT). In some storage devices, multiple lists or tables may be maintained that need to be searched as part of a logical to physical translations operation—not just a single secondary address table and a primary address table. In the example of FIG. 4, the controller 16 may first need to read a separate table or list of update block information and list of recently changed entries to the GAT, also referred to as the GAT delta, in RAM to determine whether the logical group number is part of the update blocks (at 424, 426). If the logical group number is found in an update block then the update block information is translated and the metablock address and chunk length are retrieved from the GAT delta (at 430, 432). If no logical group numbers associated with the requested logical group numbers are found in the update block information and GAT delta lists then the controller looks to see if there is a copy of a relevant GAT entry to be found cached in RAM 22 (at 428). If there is no relevant GAT entry cached in RAM 22, then the appropriate GAT page is read from flash memory, and the GAT cache is updated (at 434). The metablock address corresponding to the logical group is subsequently retrieved and chunk length is trimmed to the end of the logical group (at 436, 438).

As shown in FIG. 4, a bitmap is used to provide a potential shortcut in the process of translating logical addresses to physical addresses when a host requests data associated with identified logical groups, for example as part of a host read command received at the storage device. A single bitmap has been shown in the example of FIG. 4, but multiple bitmaps or other types of fast translation indicators may also be used to further accelerate the logical to physical translation steps in other embodiments. For example, a second list or bitmap may be used in the example of FIG. 4 to map logical groups to the update block and/or GAT delta list information so that the entirety of those update block or GAT delta lists need not be retrieved and parsed each time. Instead, as with the logical group binary cache bitmap, a similar bitmap or other fast translation indicator for one or both of those lists may be used to provide a simple single bit indicator of whether data pertaining to the logical group number of interest will be found in those lists. It is contemplated that the example of FIG. 4 illustrating one bitmap for reducing the need to retrieve and parse a secondary translation table (like the BCI) each time a host query is made may be extended to any number of translation table arrangements where, for a storage device with N different tables or lists that need to be retrieved and parsed to locate data, N−1 different bitmaps may be created and used to potentially accelerate the process of looking for data associated with logical group numbers.

Although the logic group binary cache bitmap 220 and its use in bypassing unnecessary BCI reads are described with respect to the general storage device 12 configuration noted above, other memory configurations may be used. In one implementation, a multi-level RAM cache may be used.

Referring again to FIG. 1, in one implementation the processor 18 of the storage device 12 may execute memory management instructions 23 (which may be resident in instructions 24) for operation of the memory management functions, such as detailed in FIG. 4. The memory management functions may control the assignment of the one or more portions of the memory within storage device 12, such as within controller memory 20. For example, memory management functions may allocate a RAM portion of controller memory 20 for permanent data cache, may allocate a RAM portion of controller memory 20 for temporary data cache, or may reclaim the RAM portion allocated to temporary data cache for another purpose. One, some, or all of the functions of the memory management functions may be performed by one or separate elements within the storage device 12. For example, allocating memory regions for temporary data cache may be performed by Media Management Layer (MML) firmware, and reclaiming a temporary data cache may be performed by Data Path Layer (DPL) firmware.

Control data may include data related to managing and/or controlling access to data stored in memory 26. The binary cache 28 may store up-to-date fragments of the logical groups (LGs). The main storage may comprise the data storage for the LGs. Control data may be used to manage the entries in memory, such as entries in binary cache 28 and main storage 30. For example, a binary cache index (BCI) may receive a Logical Block Address (LBA), and may map/point to the most up to date fragment(s) of the LG in binary cache 28. The GAT may receive the LBA address and map to the physical location of the LG in the main storage 30.

The processor 18 (executing the memory management instructions 23) may assign one or more portions in memory (such as volatile memory) for caching of the one or more types of data. For example, the processor 18 may assign or allocate portions of volatile memory in controller memory 20 as one or more cache storage areas 22, as discussed in more detail below. The one or more cache storage areas 22 may include a portion (or all) of the BCI and GAT that is stored in memory 26.

The processor 18 may assign an area of volatile memory as a "permanent" cache storage area, which is an area that cannot be reclaimed by the processor 18 for a different purpose (such as for caching of a different type of data). The processor 18 may also assign an area of volatile memory as a "temporary" cache storage area, which is an area that can be reclaimed by the memory management functions for a different purpose (such as for caching of a different type of data). As discussed in more detail with respect to FIG. 6, the processor 18 may determine whether there is a storage area available for use as a temporary data cache area. If so, the processor 18 may assign the available storage area for use as the temporary data cache area. The available storage area may be used as the temporary data cache area until the available storage area is reclaimed for another purpose.

As one example, the processor 18 may assign one or more cache storage areas for host data. In one embodiment, the processor 18 may assign a permanent cache storage area for host data and a temporary data cache storage area for host data. In this way, caching for the host data may have two distinct and separate areas (or two different levels) with the permanent cache storage area for host data and the temporary cache storage area for host data. In an alternate embodiment, the processor 18 may assign a first temporary cache storage area for host data and a second temporary cache storage area for host data. The first temporary cache storage area for host data may differ from the second temporary cache storage area for host data in one or more ways, such as in the portion or size of memory from which the temporary cache storage area is assigned and/or the circumstances under which the temporary cache storage area is reclaimed. Using the two different data caches (such as two different levels of data cache stored in volatile memory) may improve system performance, such as the data cache hit rate. Further, the temporary data cache may be created from unused or over-provisioned parts of volatile memory. In this way, the storage device 12 may more efficiently use its volatile memory.

As another example, the processor 18 may assign one or more cache storage areas for control data. In one embodiment, the processor 18 may assign a permanent cache storage area for control data and a temporary cache storage area for control data. Likewise, caching for the control data may have two distinct and separate areas (or two different levels) with the permanent cache storage area for control data and the temporary cache storage area for control data. In an alternate embodiment, the processor 18 may assign a first temporary cache storage area for control data and a second temporary cache storage area for control data.

The storage device 12 may further include functions for cache management. In operation, the processor 18 may execute cache management instructions 25 (which may be resident in instructions 24) for operation of the cache management functions, such as detailed in FIGS. 7A-B. The cache management functions may control searching and managing of the entries in the one or more cache storage areas 22 resident in the storage device 12. In particular, the cache management functions may prioritize eviction of certain types of entries from one or both of the separate data caches. For example, the processor 18 (executing the cache management instructions 25) may manage two separate data caches, such as the permanent data cache and the temporary data cache, as discussed in more detail below with respect to FIGS. 6A-B.

Figure 5:
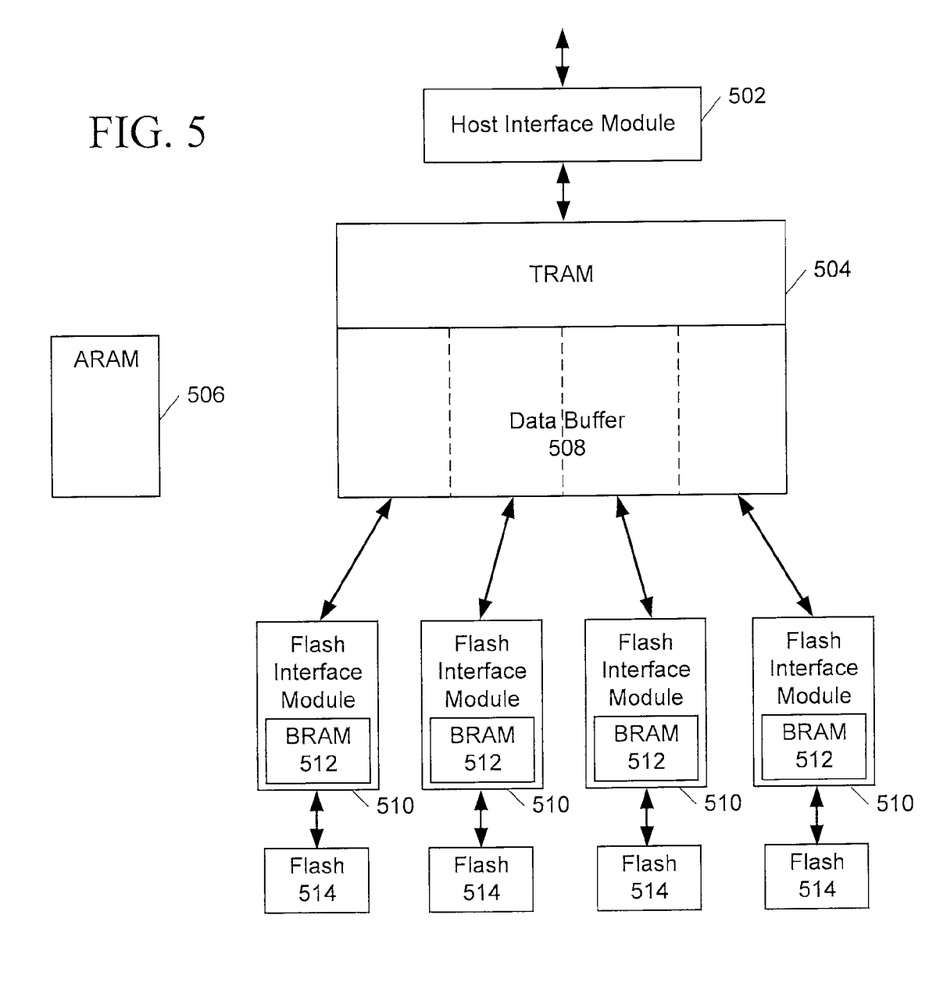
FIG. 5 illustrates a block diagram of an exemplary flash controller design.

FIG. 5 illustrates a more detailed block diagram of certain elements of controller 16 of FIG. 1, and is one example of a flash controller design. The flash controller design includes a host interface module 502 that provides the physical and electrical interface to the host system 10. The flash controller design may further include one or more volatile memories. As shown in FIG. 5, flash controller design includes multiple volatile memories, such as transfer RAM (TRAM) 504, buffer RAM (BRAM) 512, and argument RAM (ARAM) 506. The examples of ARAM, BRAM and TRAM are merely for illustration purposes only. Fewer or greater numbers of volatile memories may be used. Further, other types of RAM or different combinations of RAM may be used.

ARAM 506 may be RAM provisioned for control data caching. In this way, ARAM 506 may be considered a permanent control data caching area. For example, ARAM 506 may contain group allocation table (GAT) page cache and the logical group (LG) bit map cache or other fast translation indicator. As discussed previously, part or all of the control data stored in cache flash in memory 26 may be stored in cache RAM in controller 16 to improve operation speed. For narrow logical block address (LBA) random read test or less, the permanent LG bit map cache may reduce control read (BCI or GAT page control read) to 1 control read per random read in steady state as described above.

TRAM 504 includes a data buffer 508 that is provisioned for host data caching for host data to/from flash 514. In this way, TRAM 504 may be considered a permanent host data caching area. The flash memory 514 may be divided into one or more different portions (such as four portions as illustrated in FIG. 3), with each portion being associated with a different flash interface module 510, and a different section of data buffer 508. More or fewer portions of flash memory 514 may be used. The flash interface module 510 may include BRAM 512, which may be provisioned for error handling and/or chip-to-chip copy.

As discussed in more detail below, the temporary data cache may be located in one or multiple shared memory regions, such as TRAM 504 or BRAM 512. Using the temporary data cache may improve operation of the storage device. For full LBA range random read test, the caching of the LG bit map 220 in the temporary cache may reduce control read (BCI) to approximately one control read per random read in steady state. For narrow LBA range random read test, the caching of GAT pages in the temporary cache will reduce control read (GAT read) to approximately zero control read/random read in steady state.

Figure 6:
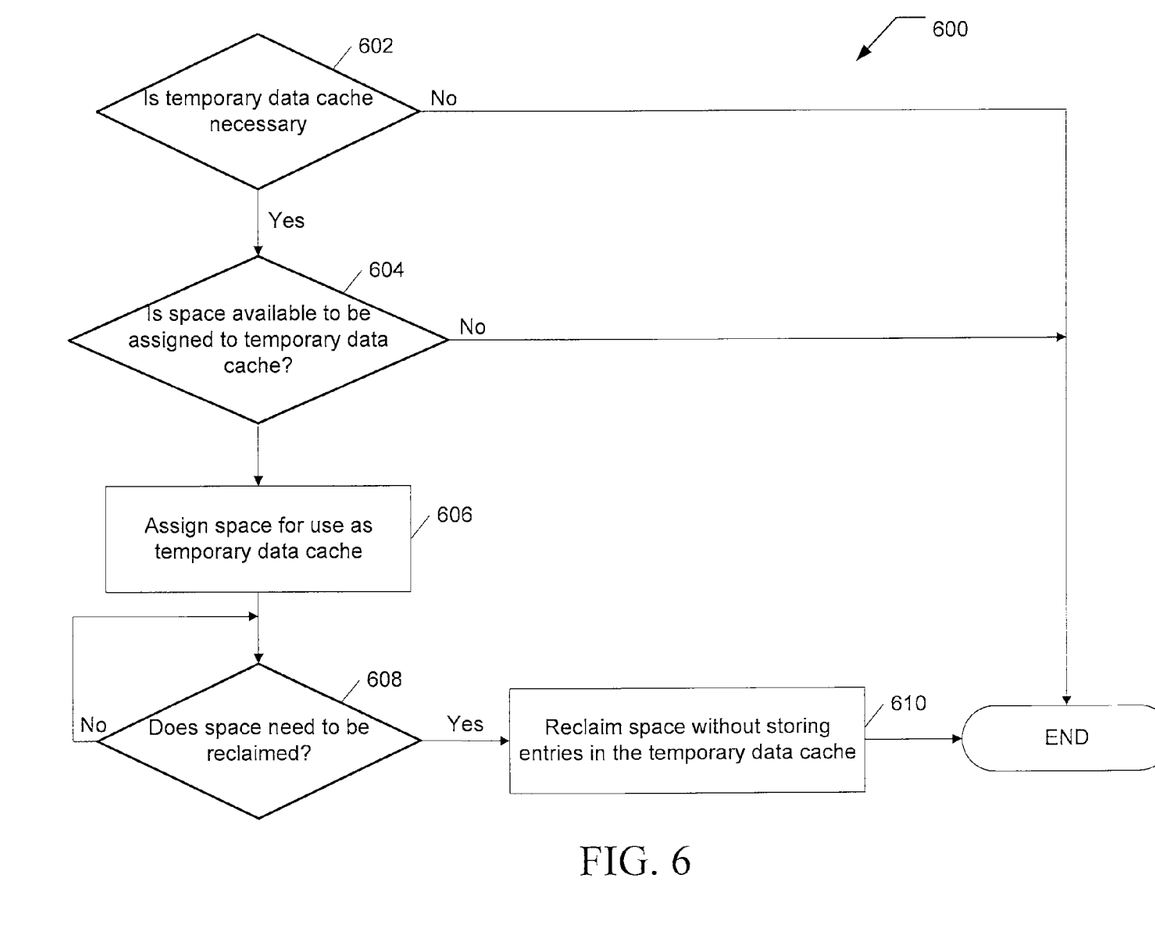
FIG. 6 is an exemplary flow diagram illustrating operation of memory management functions.

FIG. 6 is an exemplary flow diagram 600 illustrating operation of the memory management functions. As discussed above, a temporary data cache may be assigned depending on whether memory space is available for use and/or whether the temporary data cache is necessary. One or more types of data may be assigned a temporary data cache (such as control data or host data). As discussed in more detail below with respect to FIGS. 7A-B, use of the temporary data cache allows for the size of the permanent data cache to be smaller since the temporary data cache may be used for instances where additional cache is required. For example, using a temporary data cache as part of the control data cache improves performance of particular read/writes traffic types that are prevalent in SSD applications.

At 602, the processor 18 (executing the memory management instructions 23) may optionally determine whether a temporary data cache is necessary. As discussed above, one or more types of data may be cached, such as control data and host data. If a temporary data cache is necessary, the processor 18 determines whether there is space available to be assigned to a temporary data cache, as shown at 604. In the example shown in FIG. 6, the processor 18 may determine whether there is space available in one of the volatile memories, such as in TRAM 504. If the space is available, at 606, the processor 18 may assign space for use as a temporary data cache. In the example shown in FIG. 5, the processor 18 may assign a portion of data buffer 508 to a temporary data cache, such as a temporary data cache for control data. At 608, the processor 18 determines if the space needs to be reclaimed. In the example shown in FIG. 5, if TRAM 104 needs a portion of the data buffer 508 assigned as the temporary data cache for control data, the processor 18 may determine to reclaim the portion assigned. If so, at 610, the processor 18 reclaims the space without storing the entries in the temporary data cache. As discussed in more detail with respect to FIGS. 7A-B, the temporary data cache is populated with clean entries, so that the entries are stored in another part of the storage device 12 and therefore do not need to be copied elsewhere when the space associated with the temporary data cache is reclaimed.

Figure 7A:
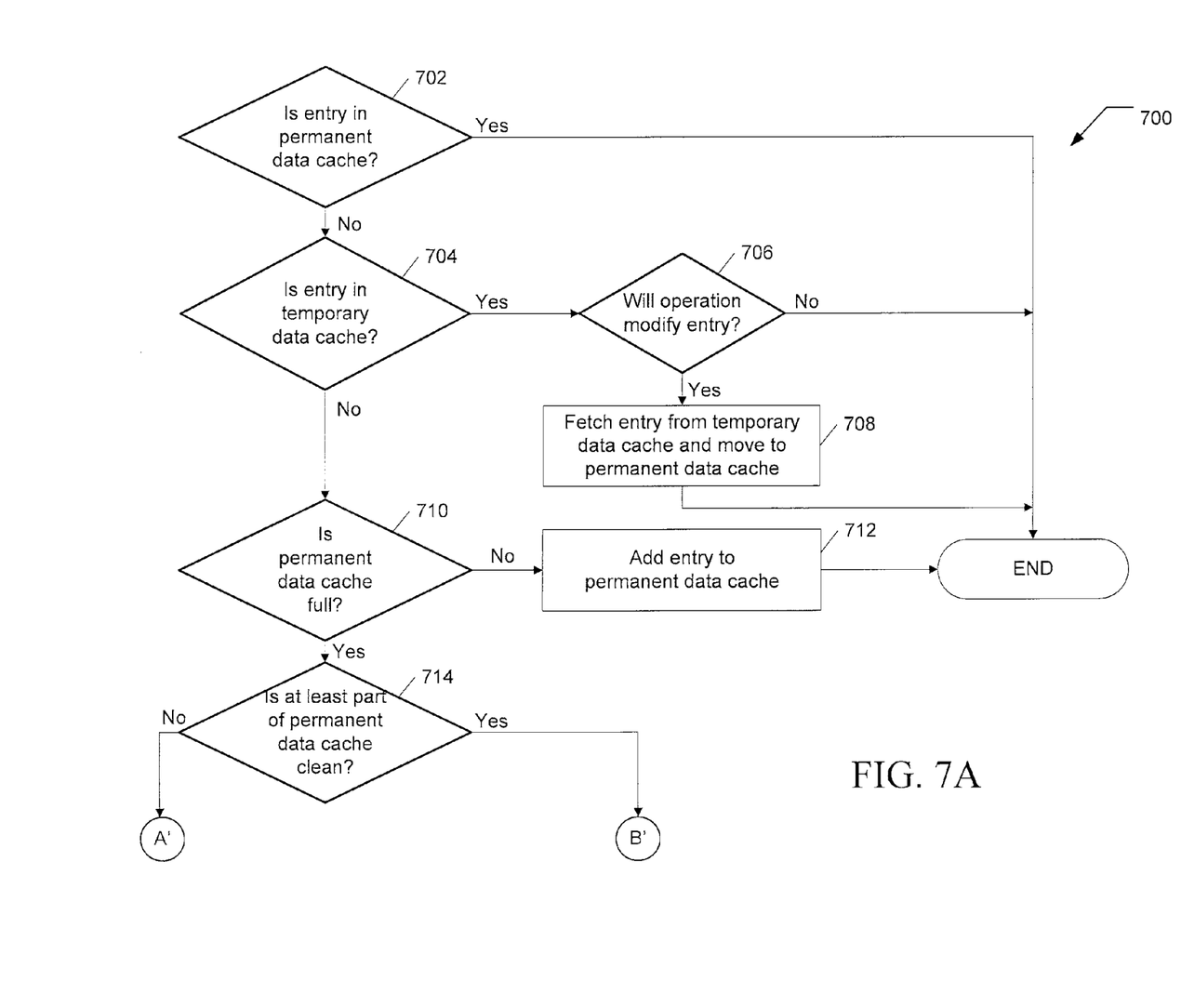
FIGS. 7A-B is an exemplary flow diagram illustrating operation of cache management functions for a permanent data cache and a temporary data cache.
Figure 7B:
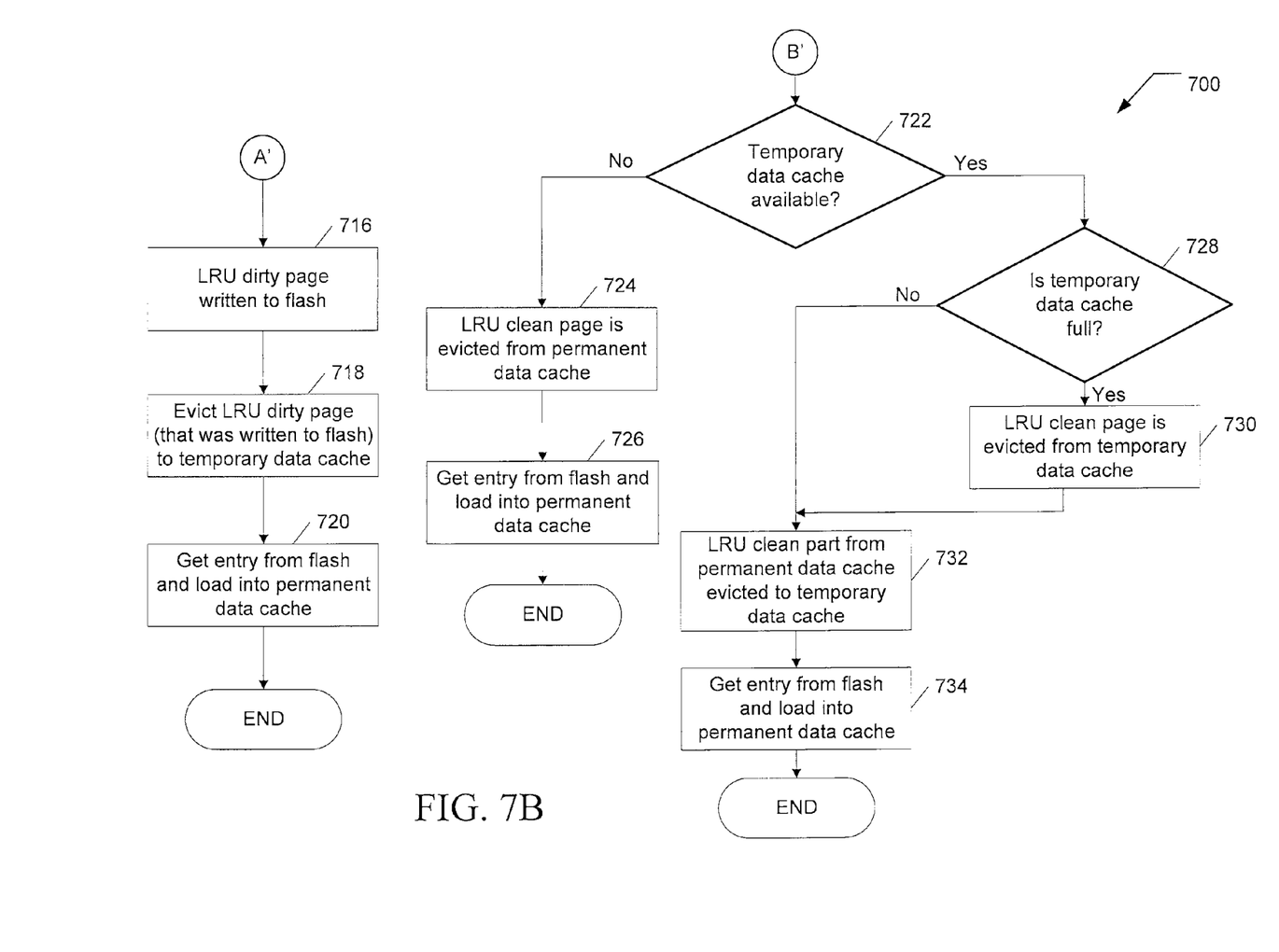

FIGS. 7A-B is an exemplary flow diagram 700 illustrating operation of a cache management functions for a permanent data cache and a temporary data cache (if present). The processor 18 (executing the cache management instructions 25) manages the entries in the temporary data cache so that all of the entries in the temporary data cache are clean. As discussed above, different types of data may be cached. In particular, a temporary data cache may be created for control data, and a temporary data cache may be created for host data. For example, a permanent GAT page cache may be used, with the permanent GAT page cache potentially containing dirty and clean entries, and the temporary GAT page cache containing clean entries only. As discussed above, since a LG bit map entry is built on the fly and does not have a backup copy in the flash, all LG bitmap data is clean. A LG bitmap cache "miss" results in a new cache entry allocated in the permanent data cache. If the permanent data cache is full, a cache entry is evicted from the permanent data cache to the temporary data cache. If the temporary data cache is full, then a cache entry from the temporary data cache is evicted.

At 702, the processor 18 determines whether an entry is in the permanent data cache. If the entry is in permanent data cache, the entry is retrieved from the permanent data cache. If not, at 704, the processor 18 determines whether the entry is in the temporary data cache.

As discussed above, a logical group binary cache bitmap (LG BC bitmap) may be used to determine if a fragment of a LG is in the binary cache or not. If a fragment is present in the binary cache per the LG BC bitmap, a BCI (binary cache index) lookup is performed. If the corresponding BCI is not cached in the RAM (such as either in the temporary data cache for BCI or the permanent data cache for BCI in RAM), then a flash control read for the missing BCI is required. If the LO does not have any fragments in the binary cache per the LG BC bitmap, then a GAT lookup is performed. If the corresponding GAT entry is not cached in the RAM (such as either in the temporary data cache for GAT or the permanent data cache for GAT in RAM), then a flash control read for the missing GAT entry is performed.

If the entry is in temporary data cache, at 706, the processor 18 determines whether the operation for which the entry is accessed will modify the entry, which impacts whether the entry is "clean". A "clean" entry accurately reflects the contents of another part of the memory on the storage device (such as flash or other non-volatile memory) and whereas a "dirty" entry does not accurately reflect the contents of another part of the memory on the storage device. Because the entries in the temporary data cache are clean, reclaiming the area of the temporary data cache is easier. If the operation modifies the entry, then the entry is not considered clean, so that at 708 the entry is fetched from the temporary data cache and moved to the permanent data cache. Thus, the entries within the temporary data cache can remain clean. As discussed in more detail below, the entries in the temporary data cache are maintained as clean, so that the contents of the entries are located elsewhere in the storage device 12. In this way, there is a duplicate of the entries that are located in the temporary data cache. Reclaiming the area assigned to the temporary data cache is made easier since the entries stored in the temporary data cache need not be copied elsewhere (since they are already stored elsewhere in the storage device 12). Rather, the processor 18 may reclaim the space without the need to store the entries in the temporary data cache, as discussed above at 610 of FIG. 6.

In the example of a OAT cache, on a cache miss in the permanent data cache and a cache hit in the temporary data cache, if the operation will modify the GAT entry, the GAT entry will be fetched from the temporary data cache and loaded into the permanent data cache. If the operation will not modify the GAT entry, then the GAT entry may remain in the temporary data cache. In addition, the same eviction policies such as described in blocks 718 and 730 may be used. Optionally, if temporary buffer space is available for GAT entries swapping, the same GAT entry eviction policy from the permanent data cache such as described in blocks 718 and 730 may be used.

If the entry is not in the permanent data cache or in the temporary data cache, the processor 18 determines if the permanent data cache is full at 710. If not, space is available in the permanent data cache for addition of the entry. So that, at 712, the entry is added to the permanent data cache. For example, if the permanent GAT cache is not full, the corresponding GAT page will be fetched from the flash and loaded into the permanent data cache.

If the permanent data cache is full, it is determined whether at least a part of the permanent data cache is clean, at 714. If so, at 722, the processor 18 determines if a temporary data cache is available (i.e., if there is space allocated for a temporary data cache). If there is no temporary data cache available, space is made available in the permanent data cache by evicting one or more pages. For example, at 724, the least recently used (LRU) clean page is evicted from the permanent data cache. The LRU algorithm may analyze the clean pages in the permanent data cache for recent use, and select for eviction the clean page that has not been used for the longest period of time. The LRU algorithm is merely one example of a methodology for the processor. Other methodologies are contemplated, such as the least frequently used (LFU) algorithm may analyze the clean pages in the permanent data cache for frequency of use, and select for eviction the clean page in the permanent data cache that has been least frequently used. At 726, the entry is obtained from flash memory and loaded into the permanent data cache.

For example, if the permanent GAT cache is full and at least one page in the permanent GAT cache is clean, and no temporary GAT cache available: the LRU clean GAT page may be evicted and the corresponding GAT page will be fetched from the flash and loaded into the permanent GAT cache.

If temporary data cache is available, at 728, the processor 18 determines whether the temporary data cache is full. If the temporary data cache is full, space is made available in the temporary data cache by evicting one or more pages. For example, at 730, the LRU clean page is evicted from the temporary data cache. Alternatively, another methodology is used to evict a page from the temporary data cache, such as the LFU algorithm.

A part of the permanent data cache is then evicted to another part of the storage device 12, such as evicted to the temporary data cache. For example, at 732, the LRU clean part from permanent data cache is evicted to temporary data cache. Alternatively, another algorithm, such as the LFU clean part from the permanent data cache is evicted to the temporary data cache. At 734, the entry is obtained from flash memory and loaded into the permanent data cache.

In the example of a OAT cache, if the permanent GAT cache is full and at least one page of the permanent GAT cache is clean, and a temporary GAT cache is available: the LRU GAT page is evicted from the temporary GAT cache (if it is full); the LRU clean GAT page from the permanent GAT cache is evicted to the temporary GAT cache; and the corresponding GAT page is fetched from the flash and loaded into the permanent GAT cache.

If the permanent data cache is full and dirty, one or more pages are copied from the permanent data cache to flash. For example, at 716, the LRU dirty page in the permanent data cache is copied to flash. Alternatively, another algorithm, such as LFU, may be used to copy a dirty page from permanent data cache to flash. Then, at 718, the page copied from the permanent data cache is evicted to the temporary data cache. At 720, the entry is obtained from flash memory and loaded into the permanent data cache. Thus, similar to 726 and 744, the flash read is loaded into permanent data cache. In this way, the management of the two levels of cache (permanent and temporary) prioritizes moving the newest entries to the permanent data cache. So that, the permanent data cache may be examined before the temporary data cache.

In the example of a GAT cache, if the permanent GAT cache is full and dirty, the LRU dirty page will be written to the flash and optionally (if present) evicted to the temporary GAT cache as a clean entry, and the corresponding GAT page will be fetched from the flash and loaded into the permanent GAT cache. If the temporary data cache would contain dirty entries, there would be a need to write the dirty entries to the flash before releasing the temporary. However, because management of the temporary data cache results in all of the entries in the temporary data cache being clean, the temporary data cache may be released instantly (without the necessity of copying any entries). One way to accomplish this is by ensuring that only clean entries are moved from the permanent data cache to the temporary data cache.

Figure 8:
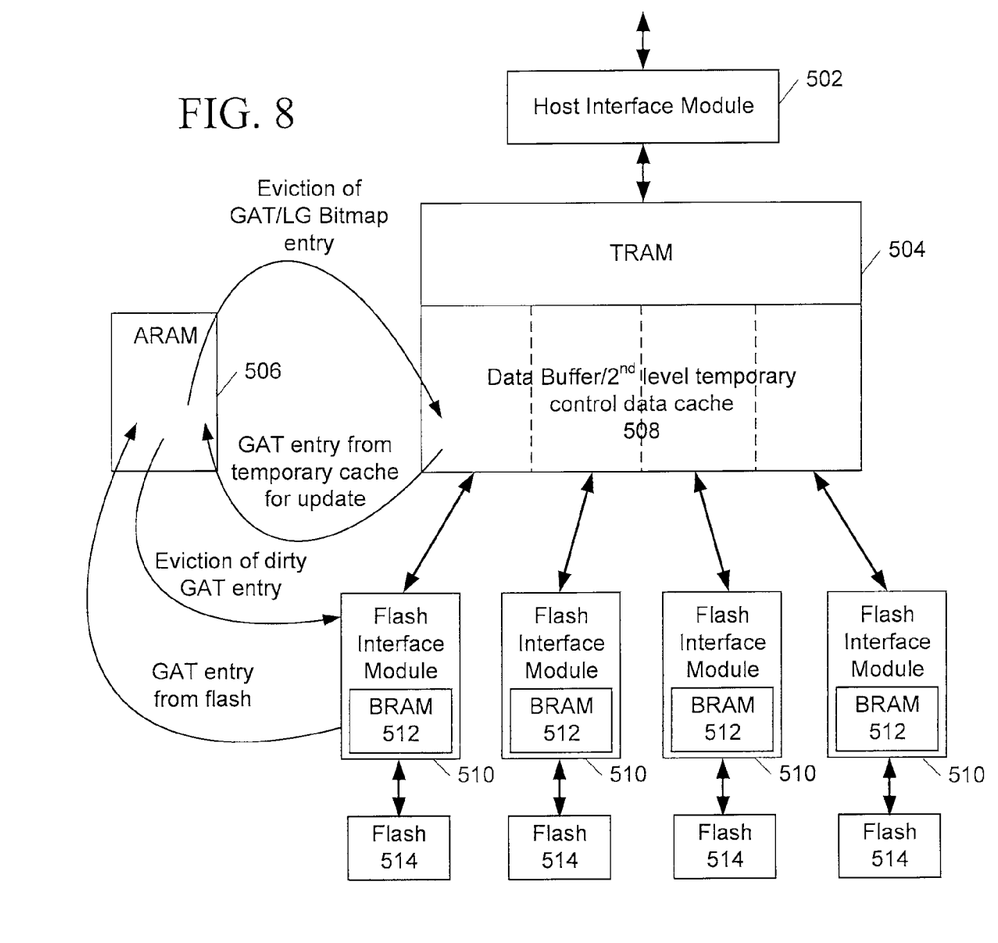
FIG. 8 illustrates the block diagram of FIG. 5 with flow of data from different volatile memories.

FIG. 8 illustrates the block diagram of FIG. 5 with flow of data from different volatile memories. ARAM 506 is RAM that is provisioned for control data caching. This may be considered the first level of control data caching. TRAM 104 is RAM that is provisioned for data buffer and host data caching. In the event that TRAM 104 has additional space not being used for data buffer and host data caching, a part of the TRAM 104 may be designated as a temporary control data cache. This may be considered the second level of control data caching. FIG. 8 illustrates various actions, such as the eviction of GAT/LG bitmap entry from ARAM 506 to TRAM 104, the eviction of a dirty GAT entry from ARAM 506 to flash, sending of a GAT entry from flash to ARAM 506, and sending of a GAT entry from temporary data cache to ARAM 506 for update. An example of one system and method of dividing a RAM cache into temporary and permanent cache space is found in co-pending application Ser. No. 13/109,777, entitled "EXPANDABLE DATA CACHE," filed on May 17, 2011, the entirety of which is incorporated herein by reference.

As disclosed above, a fast translation indicator data structure, such as a logical group bitmap or a list of logical addresses or logical groups may be used to reduce the frequency of retrieving and parsing a secondary address table during a logical to physical address translation operation. The example provided above related to a system with one logical group bitmap associated with a binary cache index, however multiple logical group bitmaps could be utilized in other implementations where multiple levels of tables or other data structures need to be retrieved and parsed during an address translation operation. Also, the logical group bitmap may be stored in permanent or temporary RAM cache memory levels as described. The granularity of the fast translation indicator may be any of a number of ranges, such as a multiple or fraction of a logical group, or a discontiguous collection of addresses or address ranges. The granularity of the fast translation indicator may also be different than that of the BCI, GAT or other data table(s). With the method and system described, a logical to physical translation operation may be accelerated by avoiding unnecessary address table retrieval and parsing.

It is intended that the foregoing detailed description be understood as an illustration of selected forms that the invention can take and not as a definition of the invention. It is only the following claims, including all equivalents, that are intended to define the scope of this invention.

We claim:

1. A storage device comprising:
   at least one non-volatile memory having a primary address table, a secondary address table, and a fast translation indicator, wherein the fast translation indicator comprises a data structure that is separate from the primary and the secondary address tables and wherein the fast translation indicator comprises information on whether logical to physical mapping information is present in the secondary address table for a logical address;
   a controller in communication with the at least one non-volatile memory and configured to:
      receive a host request identifying logical address information;
      prior to retrieving either of the primary or secondary address tables, compare the logical address information in the host request to the fast translation indicator to determine if the secondary address table contains logical to physical mapping information for responding to the host request; and
      bypass retrieval of the secondary address table and retrieve the primary address table when it is determined from the fast translation indicator that the secondary address table does not contain logical to physical mapping information for responding to the host request.

2. The storage device of claim 1, wherein the fast translation indicator comprises a bitmap correlating logical address information to a single bit indicator identifying whether or not a data entry exists in the secondary address table corresponding to the logical address information.

3. The storage device of claim 1, wherein the fast translation indicator comprises a list of logical address information regarding logical addresses associated with a data entry in the secondary address table.

4. The storage device of claim 2, wherein the logical address information comprises a logical group number.

5. The storage device of claim 2, wherein logical address information comprises multiple logical groups.

6. The storage device of claim 2, wherein the logical address information comprises a fraction of a logical group.

7. The storage device of claim 2, wherein the logical address information comprises multiple discontiguous logical areas or ranges.

8. The storage device of claim 1, wherein the controller is further configured to add a new entry to the fast translation indicator corresponding to logical address information not already included in the fast translation indicator when a threshold number of host requests identifying the logical address information has been received.

9. The storage device of claim 8, wherein the controller is further configured to delete one existing entry in the fast translation indicator when the new entry is added if a space allocated in the storage device for the fast translation indicator is full.

10. The storage device of claim 9, wherein the controller is configured to select a least recently used entry in the fast translation indicator as the one existing entry for deletion.

11. A method for accelerating a logical to physical translation in a storage device having a non-volatile memory, a primary address table and a secondary address table, the method comprising:
   in a controller of the one storage device:
      receiving a host request identifying logical address information;
      prior to retrieving either of the primary or the secondary address tables, comparing the logical address information in the host request to a fast translation indicator to determine if the secondary address table contains data needed for responding to the host request, wherein the fast translation indicator comprises a data structure that is separate from the primary and the secondary address tables and wherein the fast translation indicator comprises information on whether logical to physical mapping information is present in the secondary address table for a logical address; and
      bypassing retrieval of the secondary address table and retrieving the primary address table when it is determined from the fast translation indicator that the secondary address table does not contain logical to physical mapping information for responding to the host request.

12. The method of claim 11, wherein the fast translation indicator comprises a bitmap correlating logical address information to a single bit indicator identifying whether or not a data entry exists in the secondary address table corresponding to the logical address information.

13. The storage device of claim 12, wherein logical address information comprises multiple logical groups.

14. The storage device of claim 12, wherein the logical address information comprises a fraction of a logical group.

15. The storage device of claim 12, wherein the logical address information comprises multiple discontiguous logical areas or ranges.

16. The method of claim 11, wherein the fast translation indicator comprises a list of logical address information regarding logical addresses associated with a data entry in the secondary address table.

17. The method of claim 12, wherein the logical address information comprises a logical group number.

18. The method of claim 11, further comprising adding a new entry to the fast translation indicator corresponding to logical address information not already included in the fast translation indicator when a threshold number of host requests identifying the logical address information has been received.

19. The method of claim 18, further comprising deleting one existing entry in the fast translation indicator when the new entry is added if a space allocated in the storage device for the fast translation indicator is full.

20. The method of claim 19, further comprising selecting a least recently used entry in the fast translation indicator as the one existing entry for deletion.

\* \* \* \* \*